US008000745B2

(12) United States Patent
Kuwahara et al.

(10) Patent No.: US 8,000,745 B2

(45) Date of Patent: Aug. 16, 2011

(54) RADIO COMMUNICATION METHOD AND RADIO BASE TRANSMISSION STATION

(75) Inventors: Mikio Kuwahara, Hachioji (JP); Kenzaburo Fujishima, Niiza (JP); Masanori Taira, Yokohama (JP)

(73) Assignee: Hitachi, Ltd., Tokyo (JP)

(*) Notice: Subject to any disclaimer, the term of this patent is extended or adjusted under 35 U.S.C. 154(b) by 1094 days.

(21) Appl. No.: 11/702,648

(22) Filed: Feb. 6, 2007

(65) Prior Publication Data

US 2007/0207838 A1 Sep. 6, 2007

(30) Foreign Application Priority Data

Mar. 6, 2006 (JP) ................................ 2006-058853

(51) Int. Cl.

*H04M 1/00* (2006.01)

*H04B 1/00* (2006.01)

*H04B 15/00* (2006.01)

(52) U.S. Cl. .................... 455/562.1; 455/63.3; 455/63.4

(58) Field of Classification Search ............... 455/562.1, 455/450, 452, 446, 449, 62, 63, 561, 63.3, 455/63.4, 25, 422.1, 424, 425, 275, 703

See application file for complete search history.

(56) References Cited

U.S. PATENT DOCUMENTS 6,400,955 B1 * 6/2002 Kawabata et al. ............ 455/450
6,470,195 B1 * 10/2002 Meyer ........................ 455/562.1
2002/0085653 A1 * 7/2002 Matsuoka et al. ............ 375/347
2004/0125867 A1 * 7/2004 Tong et al. .................... 375/148
2005/0197162 A1 9/2005 Fujishima et al.

FOREIGN PATENT DOCUMENTS

JP 2000-59287 2/2000
JP 2005-159849 11/2003
JP 2004-236092 8/2004

OTHER PUBLICATIONS

Tomcik, Jim, "QFDD Technology Overview, IEEE 802.20 Working Group on Mobile Broadband Wireless Access" IEEE C802.20-05-59r1, Nov. 2005, 37 Pages Total.

Office Action from Japanese Patent Office for JP Application No. 2006-058853, Dated Nov. 16, 2010.

* cited by examiner

*Primary Examiner* — Eugene Yun

(74) *Attorney, Agent, or Firm* — Stites & Harbison PLLC; Juan Carlos A. Marquez, Esq.

(57) ABSTRACT

An antenna pattern assigning method capable of avoiding interference between a plurality of base transmission stations constituting a radio system in a cellular type broad band communication. In the radio system, when assigning a fixed beam pattern different for each frequency, each of the radio base transmission station devices transmits a radio wave having a directivity pattern having a peak in the same direction in two or more different frequencies, and between adjacent radio base transmission station devices, radio transmission is performed by using different directivity patterns in the two or more frequencies.

8 Claims, 13 Drawing Sheets

A~D : SDMA ANTENNA PATTERN

A~D : SDMA ANTENNA PATTERN

1~12 : BEAM PATTERN

■ SDMA ANTENNA PATTERN E

■ ANTENNA PATTERN F

■ ANTENNA PATTERN A

■ ANTENNA PATTERN B

■ ANTENNA PATTERN C

■ ANTENNA PATTERN D

A~D : SDMA ANTENNA PATTERN

E,F : SDMA ANTENNA PATTERN

E,F : SDMA ANTENNA PATTERN

RADIO COMMUNICATION METHOD AND RADIO BASE TRANSMISSION STATION

INCORPORATION BY REFERENCE

The present application claims priority from Japanese application JP2006-058853 filed on Mar. 6, 2006, the content of which is hereby incorporated by reference into this application.

BACKGROUND OF THE INVENTION

The present invention relates to a signal transmission method in a base transmission station device of cellular radio communication and in particular, to a beam forming method for transmitting a signal in a particular direction by using a plurality of antenna elements such as an array antenna.

In the cellular radio communication, an array antenna is used to improve an antenna gain and reduce interference to other communication. The array antenna uses a signal processing technique called “beam forming”, i.e., a signal transmission or a signal reception is performed by applying an array weight made of a complex number to a plurality of antenna elements so as to give a directivity pattern for emphasizing the antenna gain in a particular direction. The array weight is generally controlled by digital signal processing and can be freely modified at a particular timing. Thus, it is possible to adaptively modify the antenna gain in response to the user motion and always perform adaptive processing giving an optimal antenna pattern. Moreover, in the OFDM communication, when transmitting a signal by decomposing the signal into frequency components orthogonally intersecting each other by a signal processing using the FFT, the aforementioned array weight is multiplied for each tone of the decomposed frequency so as to give a different antenna pattern for each of the frequencies. For example, IEEE C802.20-05-59rl http://ieee802.org/20/DFDD Technology Overview Presentation (2005, Nov. 15) (Non-patent document 1) discloses a processing for modifying the array weight for each of the users in the OFDMA (Orthogonal Frequency Domain Multiple Access).

SUMMARY OF THE INVENTION

In a down link line for a signal transmission from a base transmission station to a terminal, when deciding the array weight, it is difficult to estimate the down link line information from the up link line information especially in the FDD system. Accordingly, it is difficult to perform adaptive array processing for always assuring preferable C/I by adaptively changing the array weight. To cope with this, there is known a method for always assuring a high-quality communication environment. In this method, a fixed array antenna pattern is being changed temporally or in frequency and a user transmits or receives a signal in synchronism with the timing or the frequency with which a beam (limited in time or limited in frequency) is transmitted in a directivity pattern directed to the user.

FIG. 1 shows an embodiment of the conventional technique. This embodiment assumes a narrow band communication. The horizontal axis indicates time and symbols A to D indicate SDMA (Spatial Domain Multiple Access) antenna pattern. The SDMA antenna pattern may be, for example, four types of antenna patterns having beam peaks in three directions as shown in FIG. 4 by using an array antenna capable of forming 12 dedicated fixed beams as shown in FIG. 2. For example, in the antenna pattern A, beams 1, 5, 9 are simultaneously transmitted.

Referring to FIG. 12, explanation will be given on signal processing of a base transmission station device which simultaneously transmits beams in three directions. FIG. 12 shows a configuration of a transmission-block baseband processing of a base transmission station device which can simultaneously transmit three signals at the maximum. A network interface 8 connected to associated network acquires information to be transmitted, from the network and accumulates it in a buffer 7. The transmission timing and the modulation method of the accumulated information is decided by a scheduler (not depicted). The modulation method is decided by using transmission channel information (CSI: Channel State Information) reported from the terminal, i.e., in accordance with its quality, i.e., C/I and needs, such as information indicating whether real time communication or non-real time communication. The transmission timing is decided by the priority for each session and the CSI. For example, the transmission timing is decided according to the scheduling algorithm such as proportional fairness, additionally taking into account needs, such as real time communication. Here, as shown in FIG. 1, the beams which can be transmitted are determined in advance and accordingly, a user for transmission is selected according to the beam to be transmitted before activating the scheduling algorithm such as the proportional fairness.

The transmission information decided by the scheduler is acquired from the buffer 7 and a modulation block 6 encodes and modulates the transmission information and performs mapping such as 64QAM. There are provided a plurality of modulation blocks 6-1 to 6-3 and up to three signals may be processed in parallel for a user. The signal processed by the modulation block 6-X is then inputted to a channel formatting block 5-X, where additional information such as a pilot signal and a dedicated control channel is added to the signal. In the channel formatting block 5-X, a channel formatting block 5-4 is added for transmitting common information into a cell and four signals are simultaneously generated. Each of the signals is converted into a signal for each antenna to which an array weight required for beam forming by the down link beam forming block 4-X is multiplied. The signals are added together in a signal synthesis block 20 for each antenna and the four signals (three user signals and one common control signal) are combined into one signal. The combined signal for each antenna is subjected to analog conversion and frequency conversion at an analog front end block 2 and transmitted from the antenna 1 after appropriate signal amplification.

By these processes, it is possible to generate information based on each SDMA in parallel, combine them, and transmit the combined signal from the antenna. Each beam is designed to suppress the side lobe level to −20 dB, for example, in a direction other than the main beam. It is possible to obtain a sufficiently high D/U, i.e., the power ratio of a desired wave to an interference wave. As a result, even if the three beams are simultaneously transmitted, it is possible to obtain about −17 dB D/U and performs SDMA (Spatial Domain multiplex access).

It should be noted that in the case of a base transmission station transmitting only pattern A, good communications are possible only with users in a particular direction. To cope with this, by modifying the SDMA pattern temporally, it becomes possible to communicate with users in any direction of the 12 beams. Returning to the example of FIG. 1, the SDMA antenna pattern is changed from A to B to C to D to A at a predetermined time interval. When the base transmission station is viewed from above, one can see three propellers rotating counterclockwise to supply beams into the entire cell according to the temporal change of the beams transmitting signals in three directions. In this method, after transmission by the pattern A, transmission of the pattern A is performed again only after a predetermined interval. Accordingly, for a user, packet transmission interval is increased and the transmission is delayed. Moreover, for signal transmission, the packet scheduler is operated by using the channel estimation result information. However, even if channel estimation is performed by pattern A, a time elapses until the next pattern A transmission is performed and the channel state may be change. Accordingly, there is a problem that the scheduler cannot effectively operate for the terminal moving at a high speed.

In order to solve these problems, it is possible to assign an antenna pattern in the broad band having a spread frequency region as shown in FIG. 5. In FIG. 5 the horizontal axis represents time and the vertical axis represents frequency. In this example, for each frequency, a different antenna pattern is assigned. At a particular frequency, transmission is performed with a fixed antenna pattern. Thus, like assignment of the antenna pattern in the time region, it is possible to communicate with users in any of the 12-beam directions. At a particular frequency, the antenna pattern is fixed and the aforementioned transmission delay or the channel estimation delay is not caused.

Referring to FIG. 13, explanation will be given on the signal processing of the base transmission station device simultaneously transmitting beams in three directions in the broad band system. FIG. 13 shows a configuration of a transmission-block baseband processing of an OFDMA-base base transmission station device which simultaneously transmits up to N signals. The network interface 8 connected to a network acquires information to be transmitted, from the network and accumulates it in the buffer 7. The transmission timing and the modulation method of the accumulated information is decided by a scheduler (not depicted). Using transmission channel information (CSI: Channel State Information) reported from a terminal, the modulation method is decided by its quality, i.e., C/I and by needs such as whether real time communication or non-real time communication. The transmission timing is decided according to the priority with other communication and CSI, taking account of the needs such as whether the communication is a real time communication based on the scheduling algorithm such as proportional fairness. Here, as shown in FIG. 5, the beam which can be transmitted by each frequency band has been decided in advance and accordingly, the scheduling algorithm such as the proportional fairness is activated after selecting a transmitting user based on the beam to be transmitted.

The transmission information decided by the scheduler is acquired from the buffer 7 and the modulation block 6 performs encoding of the transmission channel and mapping, such as 64QAM. There are provided a plurality of modulation blocks 6-1 to 6-N. When the SDMA pattern of FIG. 4 is employed, up to three users may perform signal processing of simultaneous communication. The signal processed by the modulation block 6-X is then inputted to a channel formatting block 5-X, where additional information, such as a pilot signal and a dedicated control channel is added to the signal. In the channel formatting block 5-X, a channel formatting block 5-4 is added for transmitting common information into a cell and a new channel formatting block 5-4 is added. Each of the signals is multiplied by an array weight required for beam forming by the down link beam forming block 4-X and converted into a signal for each antenna/sub carrier. Next, N+1 signals are added together for each antenna/sub carrier and combined into one signal in a synthesis block 20. The combined signal for each antenna/sub carrier is converted from frequency domain information to time domain information to become information for each antenna in an IFFT block 3. The obtained time domain signal for each antenna is subjected to analog conversion and frequency conversion at the analog front end block 2 and transmitted from the antenna 1 after appropriate signal amplification.

Hereinafter, explanation will be given of the down link line circuit. In the conventional base transmission station device, a technique introduced therein is such that an antenna pattern is fixed on the temporal axis or the frequency axis in a single base transmission station device alone. However, in the cellular radio communication, a plurality of base transmission stations constitute a single system and no clear solution of how to assign antenna patterns for such a plurality of base transmission stations has been revealed yet. Especially in the radio communication using the CDMA or the OFDMA, frequency reuse is 1 or near 1 in the system and accordingly, there is a possibility that the same frequency is also used in an adjacent base transmission station. In this case, the factors for deciding the C/I at the terminal are the signal power decided by the signal power from the base transmission station, the interference signal power decided by the beam directed to another user formed by another sector or array antenna of the same station or a signal from another cell, and the thermal noise power of the terminal. Consequently, it was necessary to assign the antenna pattern including the interference from an adjacent base transmission station.

FIG. 6 shows a case in which two base transmission stations have antenna patterns synchronized in frequency. In the figure, the horizontal axis represents time and the vertical axis represents frequency. The upper diagram and the lower diagram show a combination of the SDMA antenna patterns of the two base transmission stations. Here, E and F represent SDMA antenna patterns combining 6 beams. In the figure, the antenna patterns are synchronized in the frequency. Accordingly, a user connected to the base transmission station A using the antenna pattern E and affected by the strong interference beam of the antenna pattern E of the base transmission station B cannot prevent interference from the base transmission station B.

The aforementioned problems can be solved by a first radio communication method using two or more radio base transmission station devices each having a function to transmit or receive a radio signal by a fixed directivity pattern and capable of selecting the directivity pattern for each frequency, wherein each of the radio base transmission station devices transmits or receives a signal by a radio wave having a directivity pattern having a peak in the same direction in two or more different frequencies and, between adjacent radio base transmission station devices, a signal is transmitted or received with the above-mentioned two or more different frequencies each being combined with a different directivity pattern in different correspondence patterns.

Moreover, the aforementioned problems can be solved in a second radio communication method, wherein the radio base transmission station device has a function for temporally selecting the directivity pattern in addition to frequency selection and when an element as a minimum unit for a fixed directivity pattern formed by a matrix of frequency and time is called a channel, each of the radio base transmission station devices transmits or receives a signal by a radio wave having a directivity pattern having a peak in the same direction in two or more different channels and, between adjacent radio base transmission station devices, a signal is transmitted or received by a radio wave using different directivity patterns in the two or more different channels.

Moreover, the aforementioned problems can be solved in a third radio communication method, wherein seven or more adjacent radio base transmission station devices are combined as a set, in which each of the radio base transmission station devices transmits or receives a signal by a radio wave having a directivity pattern having a peak in the same direction in two or more different frequencies and, between different radio base transmission station devices in the set, a radio wave is transmitted or received by using the above-mentioned two or more different frequencies in different directivity patterns, and a set formed by seven or more adjacent radio base transmission station devices is cyclically repeated.

Moreover, the aforementioned problems can be solved in a fourth radio communication method, wherein the Walsh function is used for assignment of directivity pattern between adjacent radio base transmission station devices.

Moreover, the aforementioned problems can be solved by a first radio base transmission station device comprising a memory for storing a plurality of directivity patterns which are different for each of plural frequencies, a beam forming block for forming a beam for each of the frequencies by applying an array weight to a down link signal in accordance with the memory, an IFFT block for subjecting an output of the beam forming block to inverse fast Fourier transform, and an analog front end block for converting an output of the IFFT block into an analog signal and transmitting it from an antenna; wherein the array weight stored in the memory generates a directivity pattern having a peak in the same direction in two or more different frequencies and, between adjacent radio base transmission station devices, generate different directivity patterns with the two or more different frequencies.

Moreover, the aforementioned problems can be solved in the first radio base transmission station device by adopting a second radio base transmission station device, wherein the beam forming block has a function for temporally selecting the directivity pattern in addition to frequency selection, and when an element as a minimum unit for a fixed directivity pattern formed by a matrix of frequency and time is called channel, the array weight stored in the memory generates a directivity pattern having a peak in the same direction in two or more different channels and, between adjacent radio station devices, generates different directivity patterns in the two or more different channels.

Moreover, the aforementioned problems can be solved in the first radio base transmission station device by adopting a third radio base transmission station device, wherein seven or more adjacent radio base transmission station devices are combined as a set and array weights stored in a memory of each radio base transmission station device in the set generates a directivity pattern having a peak in the same direction in two or more different frequencies and, between adjacent base transmission station devices in the set, generates different directivity patterns in the two or more different frequencies.

According to the present invention, a plurality of base transmission stations are combined to form an SDMA antenna pattern. Accordingly, for a user affected by a strong interference from an adjacent base transmission station, it is possible to perform signal transmission with a frequency or time which avoids the interference. By combination with a scheduler, a packet scheduling is enabled by avoiding a strong interference from an adjacent station.

Other objects, features and advantages of the invention will become apparent from the following description of the embodiments of the invention taken in conjunction with the accompanying drawings.

DESCRIPTION OF THE EMBODIMENTS

Figure 6:
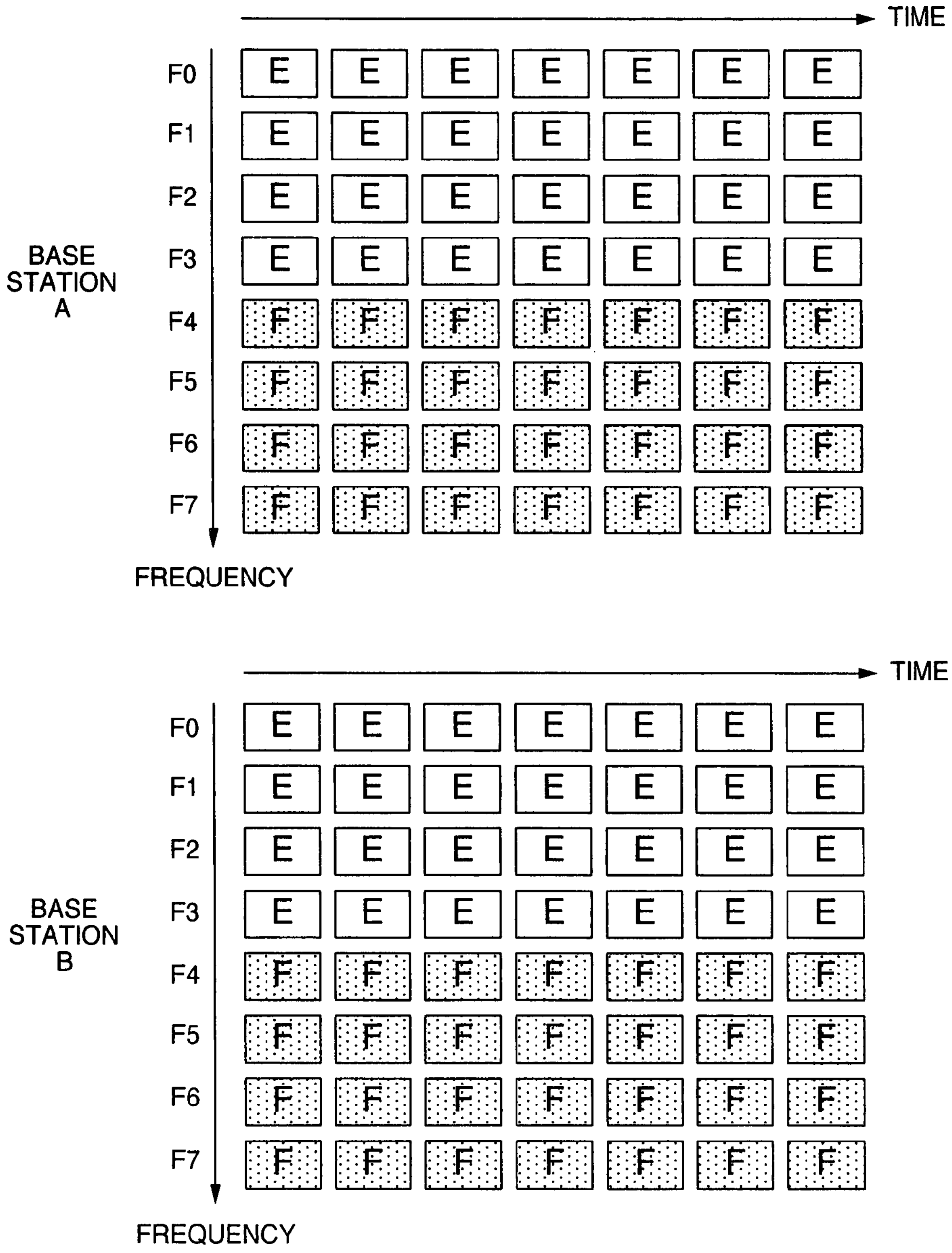
FIG. 6 shows a conventional example of allocation of an antenna pattern for a plurality of base transmission stations (broad band).
Figure 7:
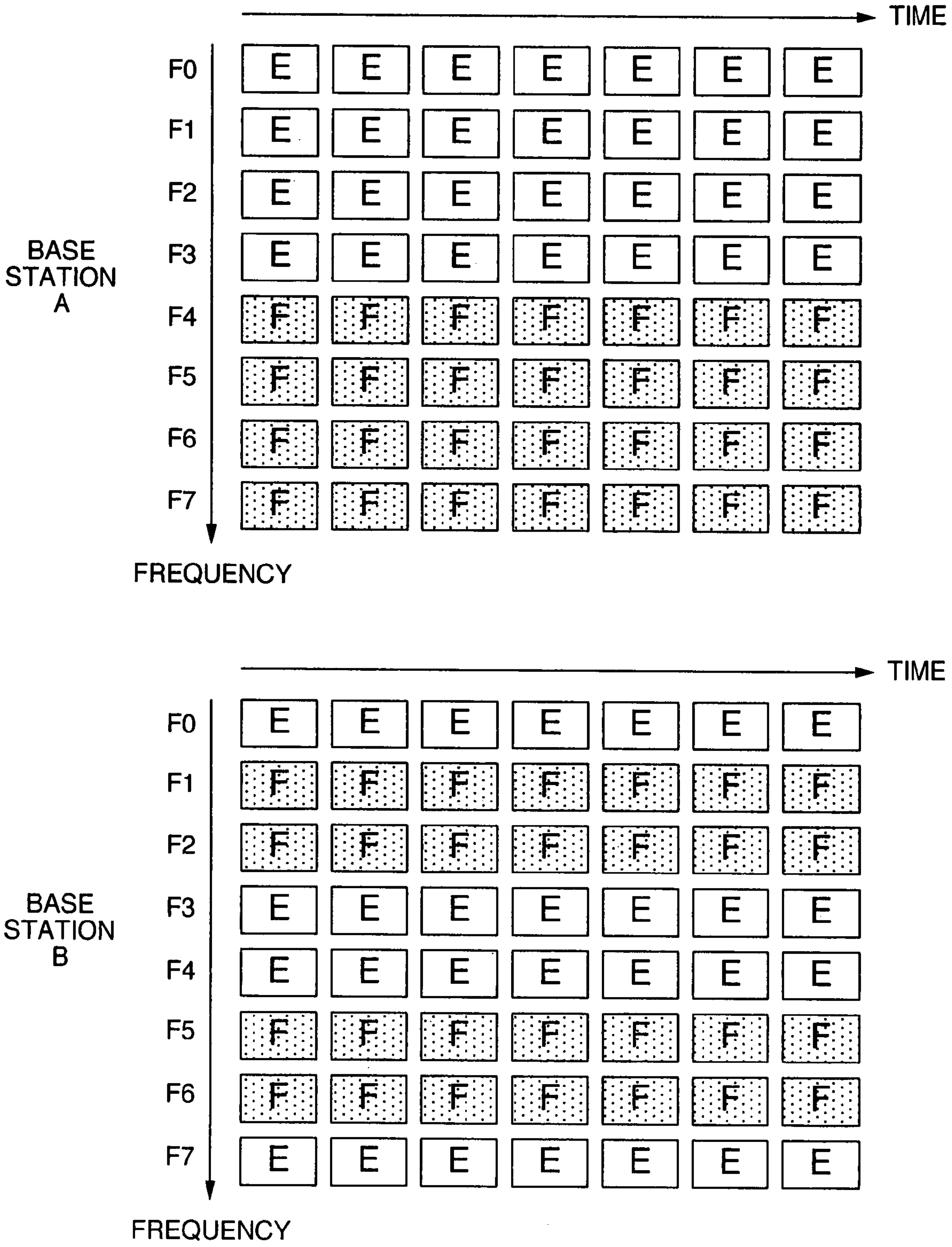
FIG. 7 shows an example of allocation of an antenna pattern for a plurality of base transmission stations (broad band) according to the present invention.

Description will now be directed to embodiments of the present invention. FIG. 7 shows a case where a combination of SDMA antenna patterns is changed according to the frequency between the adjacent base transmission stations. As has been explained in the Summary of Invention, in the case of FIG. 6, it was difficult to prevent interference between base transmission stations. However, in FIG. 7 the antenna pattern for each frequency is set to be different between the adjacent base transmission stations and it is possible to carry out packet allocation in such a manner that affect of interference beam from other stations may be avoided. For example, when a user is connected to a base transmission station A by using an antenna pattern (directivity pattern) E and the antenna E of the base transmission station B is providing a strong interfering beam to the user, F0 to F3 out of the frequencies F0 to F7 are good antenna patterns for the base transmission station A and, of the frequencies F0 to F3, F1 and F2 are transmitted by the antenna pattern F from the base transmission station B. Accordingly, the user can make communication while preventing affect of the interference from the adjacent base transmission station by preferentially using the F1 or F2.

In the cellular communication, a plurality of base transmission stations exist around and it is necessary to avoid affect of the interfering beams therefrom and a beam assignment using the Walsh function is performed as an area on the beam frequency axis or time axis, by which the affect of the interfering beam from the adjacent base transmission stations is pseudo-randomized.

As a result, when viewed from a certain terminal, in the frequencies (or time) at which beam is directed to the terminal, there will be generated a frequency (or time) at which interference is generated from a base transmission station giving a strong interference and a frequency (or time) at which interference is prevented. Thus, a large dispersion is generated in the channel state. Since channel allocation is performed by the scheduler according to the channel state, a frequency (or time) having less interference is preferentially selected and the interference is naturally prevented. Since it is possible to allocate frequency hardly affected by the interference for each of the terminals, it is possible to improve the communication capacity of the entire base transmission stations and the entire communication system.

The first embodiment will be explained through an example of the system simultaneously transmitting six beams shown in FIG. 3A and FIG. 3B.

Figure 1:
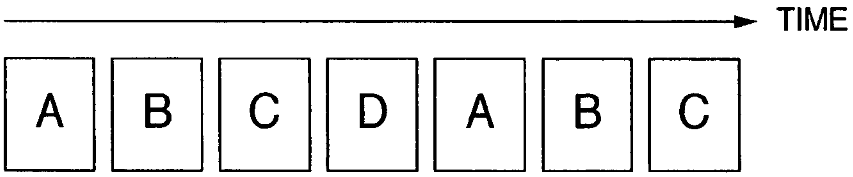
FIG. 1 shows a conventional example of allocation of an antenna pattern for a signal base transmission station (narrow band).
Figure 2:
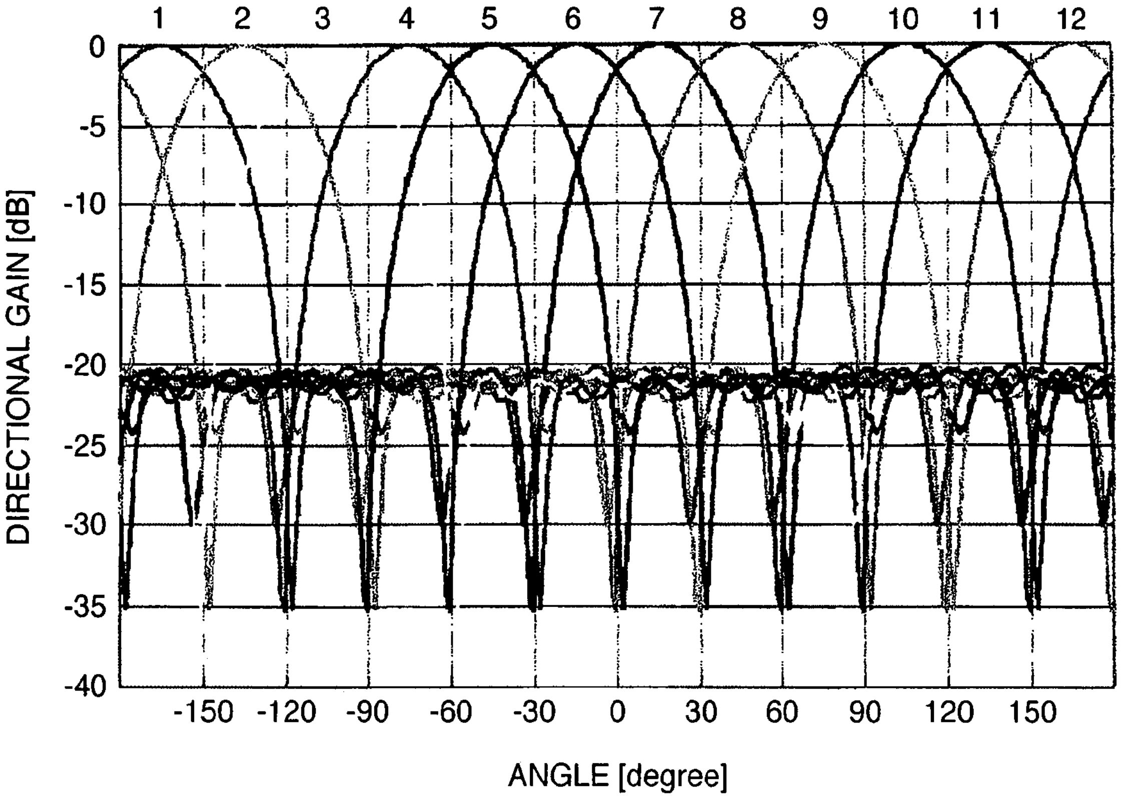
FIG. 2 shows an example of an antenna pattern.
Figure 3A:
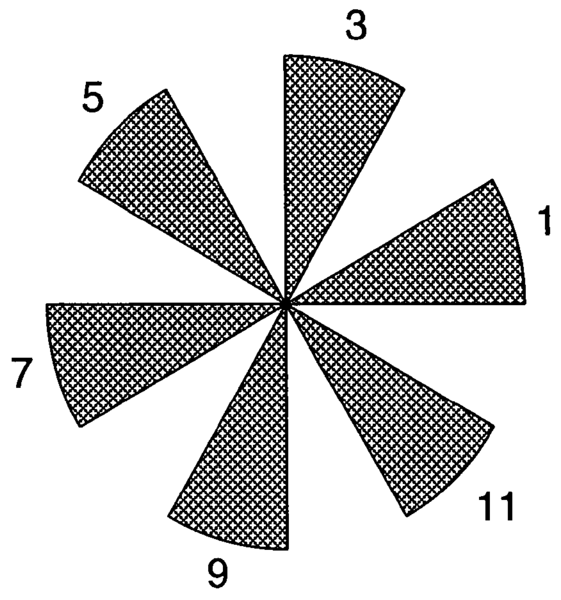
FIG. 3A and FIG. 3B show examples of an antenna pattern when SDMA is executed (6-SDMA case).
Figure 3B:
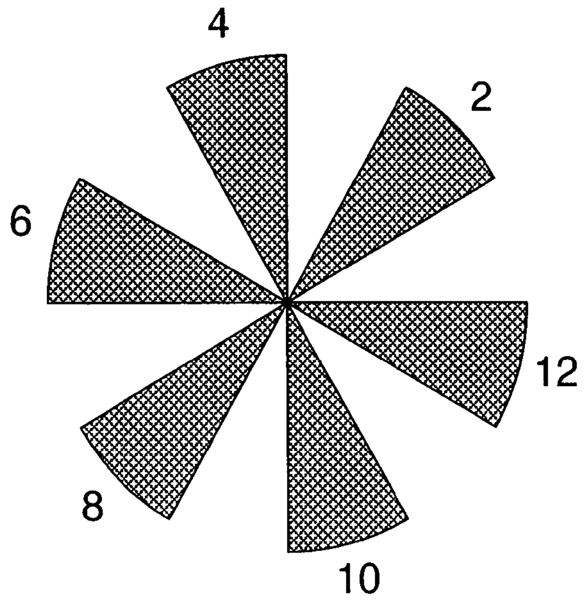
Figure 8:
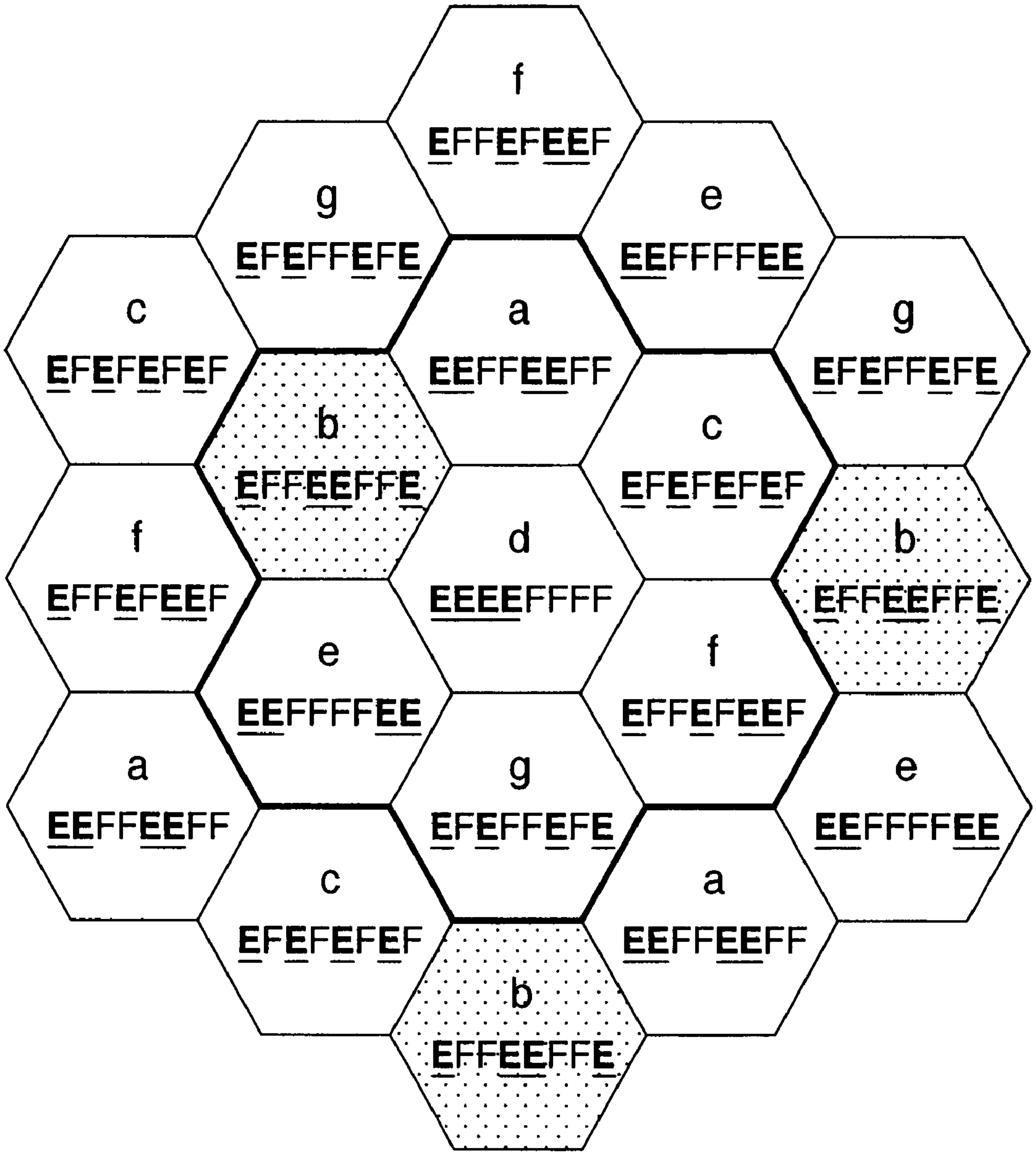
FIG. 8 shows an example of allocation of an antenna pattern for a plurality of base transmission stations (6-SDMA case) according to the present invention.
Figure 8:
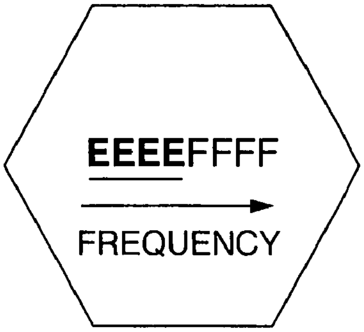

FIG. 3A shows an antenna pattern E (1, 3, 5, 7, 9, 11) simultaneously transmitting a signal to six users and FIG. 3 B shows an antenna pattern F (2, 4, 6, 8, 10, 12) also transmitting a signal simultaneously to six users. Antenna patterns between adjacent cells are arranged, for example, as shown in FIG. 8. FIG. 8 shows hexagonal cells representing service areas of the respective base transmission stations. A base transmission station is arranged at the center of each hexagonal area. There is shown a cell named "d" in the center of the figure. In the cell, "EEEEFFFF" is written. This indicates the correspondence between the frequency and the antenna pattern. The leftmost first E represents an antenna pattern E of the lowest frequency. The next frequency band is also E pattern. Four E patters appear continuously and then F pattern appears. That is, the antenna pattern is allocated as follows:

Frequency F0-E pattern
Frequency F1-E pattern
Frequency F2-E pattern
Frequency F3-E pattern
Frequency F4-F pattern
Frequency F5-F pattern
Frequency F6-F pattern
Frequency F7-F pattern This combination of frequency and the antenna pattern will be called "d-pattern". When looking around the cell of the d pattern, a pattern other than the d-pattern is surrounding. No d-pattern exists adjacent to the d-pattern cell. One of the adjacent patterns is, for example, "a-pattern" as follows:

Frequency F0-E pattern
Frequency F1-E pattern
Frequency F2-F pattern
Frequency F3-F pattern
Frequency F4-F pattern
Frequency F5-F pattern
Frequency F6-F pattern
Frequency F7-F pattern Thus, the antenna pattern is differently arranged from the d-pattern. As has been explained in FIG. 7, it is possible to prevent affect of the interfering beam between adjacent cells. This relationship is designed so as to be met when any two of the a-patterns to g-patterns are selected. Accordingly, there always exists a frequency preventing the affect of the interfering beam from the adjacent base transmission station. By selecting an appropriate frequency at the scheduler, it is possible to prevent the affect of the interfering beam from the adjacent base transmission station. In FIG. 8, the a-pattern to the g-pattern are repeatedly arranged in units of seven cells. Consequently, cells are so arranged that any one of the cells may be surrounded by six cells having patterns different from the surrounded cell, thereby making it possible to prevent interference. This solves the problem.

Here, the arrangement of the frequency and the corresponding antenna pattern is designed by using the Walsh function. When the Walsh function of length N is used, N−1 sets of antenna pattern can be designed. For example, when N=4, four Walsh codes can be created as follows: "1111", "1100", "1001", and "1010". The first "1111" in which all is 1 is excluded. By using the three codes "1100", "1001" and "1010", an antenna pattern is designed. When the antenna patterns are two independent patterns as in FIG. 3, all design work is completed by replacing 1 by the antenna pattern E and 0 by antenna pattern F. That is, it is possible to obtain "EEFF", "EFFE", and "EFEF". When N=4, the cell repetition is 3. Accordingly, around a particular base transmission station, there is no pattern identical to the particular base transmission station. However, adjacent base transmission stations may have identical patterns. Due to this, there is a possibility that a certain interference pattern may not be prevented. On the other hand, when N=8, the cell repetition is 7. In the case of hexagonal cells, as shown in the example of FIG. 8, it is possible to design so that a particular cell is surrounded by six base transmission stations having antenna patterns different from one another and different from the particular cell. Accordingly, the antenna pattern is sufficiently randomized and it is possible to sufficiently prevent interference. By designing the arrangement of the frequencies and the antenna patterns using the Walsh function and orthogonalizing the correspondence pattern between the frequency-antenna pattern of the adjacent base transmission stations, the cell design becomes simplified. However, without completely orthogonalizing the correspondence pattern, it is still possible to increase the communication speed at the terminals and improve the capacity at the base transmission stations if the correspondence pattern of the frequency-directivity pattern can be guaranteed to be different between the adjacent base transmission stations.

Figure 11:
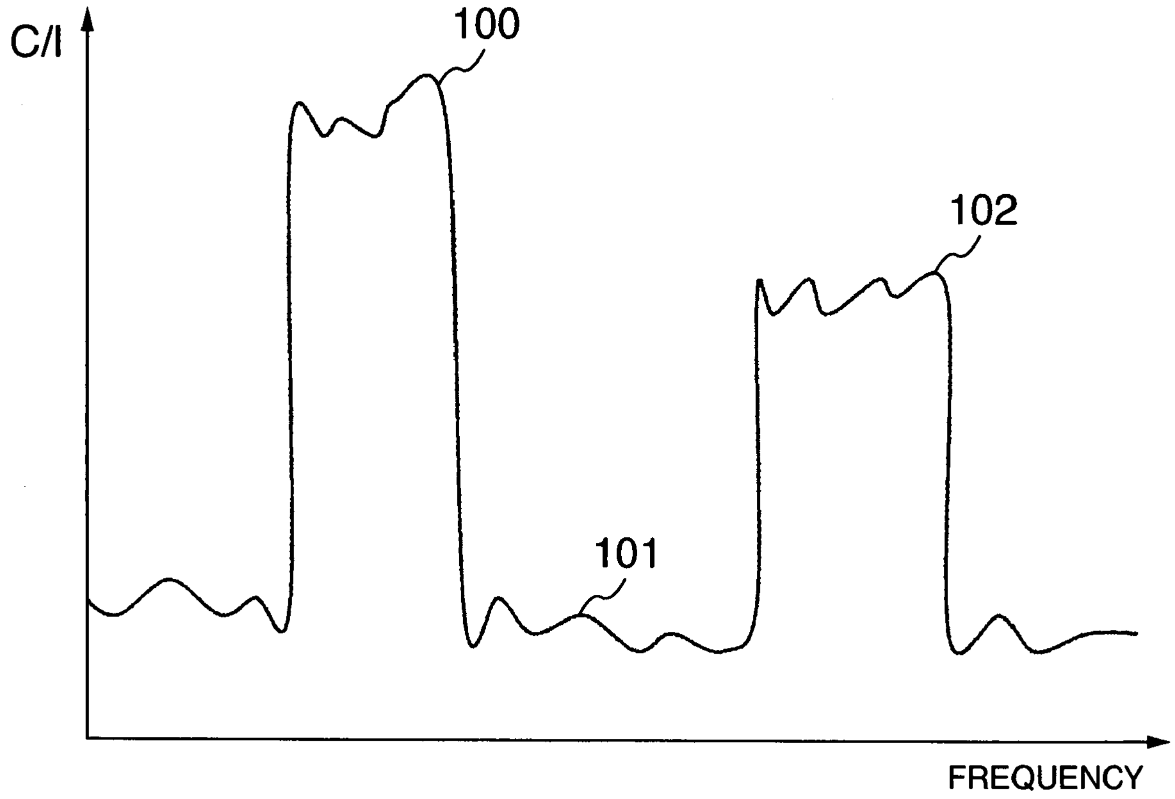
FIG. 11 shows an example of frequency characteristic of C/I when the present invention is executed.
Figure 12:
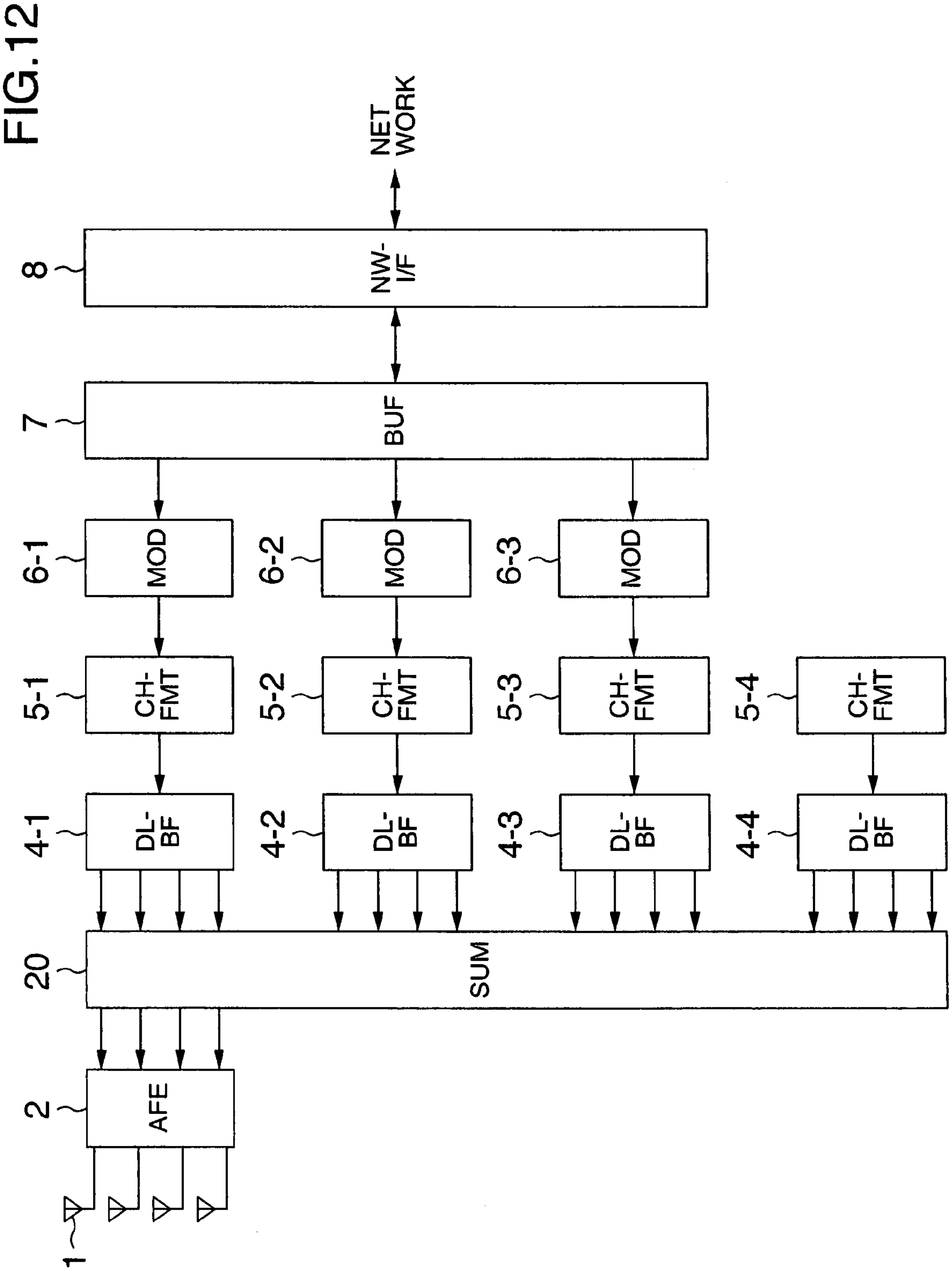
FIG. 12 shows a conventional down link SDMA beam transmission device (narrow band).

FIG. 11 is a schematic diagram of the C/I observed at the terminal side. In the figure, the horizontal axis represents frequency and the vertical axis represents the C/I observed. A serving base transmission station exhibiting the strongest electric wave at particular frequencies 100 and 102 for the terminal outputs a beam in the direction of the terminal. On the other hand, interference from an adjacent base transmission station is also great and especially at frequency 102, the interfering beam is directed toward the terminal. As a result, it is observed that the frequency 100 is a communication channel having the best C/I and this is reported to the serving base transmission station. In the serving base transmission station, according to a scheduling rule such as a proportional fairness, for example, channel allocation is performed to the terminal. Since in the proportional fairness, the channel is allocated according to the C/I, the frequency 100 is preferentially allocated to the terminal.

Figure 14:
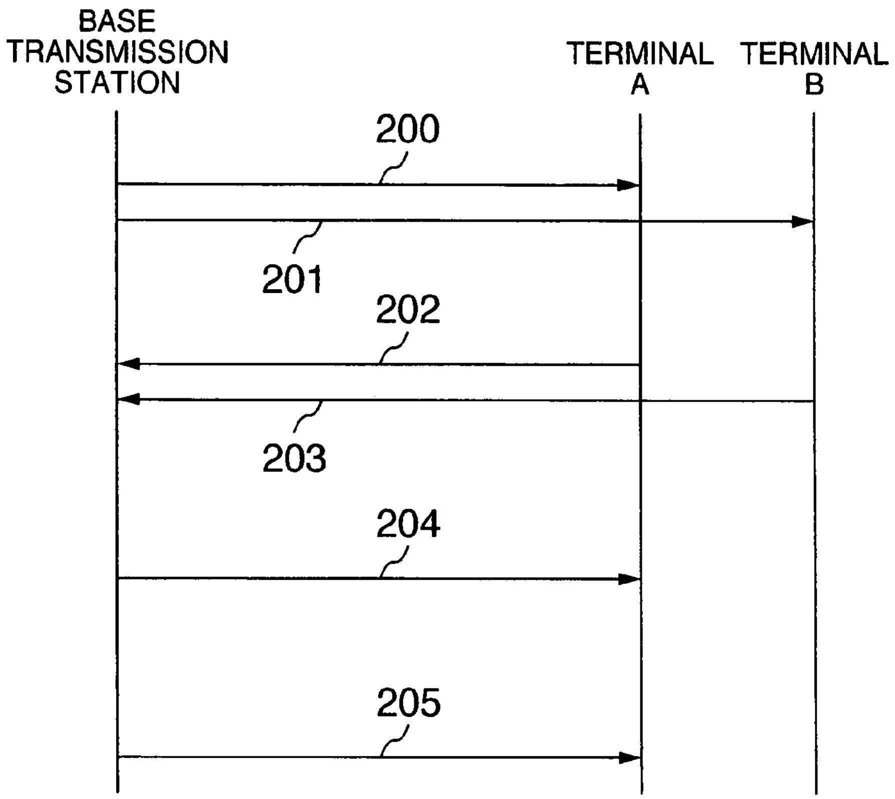
FIG. 14 shows a flow diagram for channel allocation.

Referring to FIG. 14, explanation will be given of a channel allocation flow. In FIG. 14, the vertical axes represent time axes proceeding downward. The three axes represent a time axis of a base transmission station, a time axis of a terminal A, and a time axis of a terminal B, respectively. Arrows indicate the flow of signals issued. Firstly, the base transmission station issues pilot signals (200, 201) for measuring channels. The pilot signal is transmitted according to an antenna pattern. Each of the terminal A and the terminal B measures the pilot C/I and creates a C/I frequency distribution like FIG. 11.

From the created C/I result, propagation channel information (CSI: Channel State Information) (202, 203) are created and transmitted to the base transmission station. The CSI may be information on all the frequencies. However, since this consumes a radio band, it is possible to transmit only propagation channel information CSI for frequencies exceeding a predetermined threshold value. The base transmission station performs scheduling of the channel according to the CSI received. According to the scheduling result, a channel allocation result (204) is transmitted to the corresponding terminal. Furthermore, the base transmission station transmits data (305) to the terminal according to the scheduling. The terminal receives the signal (205) in the scheduling received.

Figure 15:
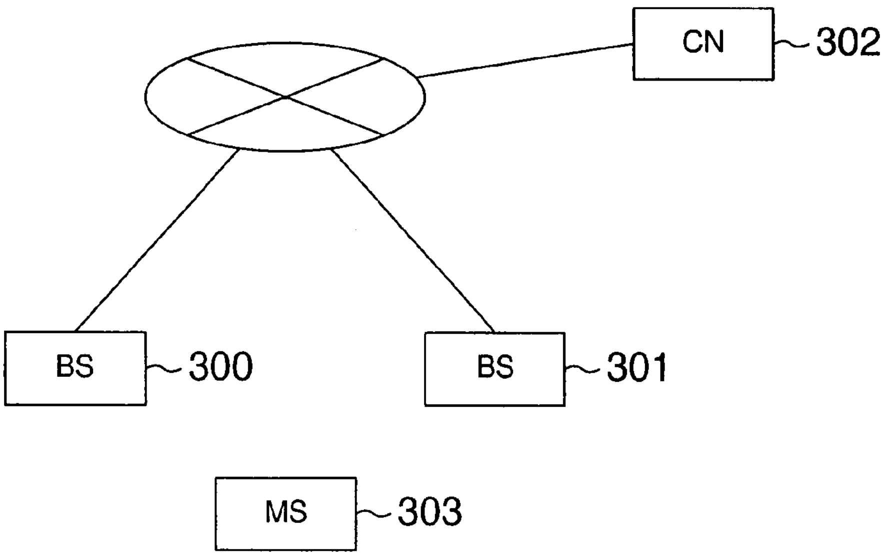
FIG. 15 shows a configuration of an entire system.

Referring to FIG. 15, an example of control of the entire system will be shown. In FIG. 15, two base transmission stations (300, 301) are connected via a network (304). For each of the base transmission stations, an antenna pattern is specified according to an instruction from a BS controlling node (302). Assume that a traffic request is increased in a particular base transmission station (for example, 300). The BS controlling node (302) periodically receives a report about the traffic state from the base transmission station. When the traffic exceeds a threshold value, the traffic is preferentially allocated and accordingly, a scheduling suppression instruction is outputted to the adjacent base transmission stations. A base transmission station (for example, 301) which has received the scheduling suppression instruction suppresses the scheduling and suppresses the channel allocation ratio to 80%, for example. Accordingly, the probability of signal transmission from the base transmission station 301 is lowered to 80%. As a result, the communication C/I of the base transmission station 300 is improved, thereby improving the throughput.

Alternatively, the scope of the present invention also includes a method for outputting an instruction for dynamically modifying the antenna pattern from the BS controlling node. For example, when a new base transmission station is established or when a traffic of a particular area is temporarily increased as has been described above, a plenty of requests for transmitting a beam in the direction in which many terminals are disposed are made. In this case also, according to the antenna pattern modification request from the base transmission station, an antenna pattern modification instruction (or permission) is transmitted from the BS controlling node (302) according to the antenna pattern modification request from the base transmission station. In response to this, the base transmission station increases the beam pattern in the direction in which more beams are desired to be transmitted. This copes with increase of the traffic generated locally. Moreover, since the BS controlling node (302) can grasp information on the base transmission stations in the area, it is possible to manage the traffic by antenna pattern modification while maintaining the management simplicity.

Figure 9:
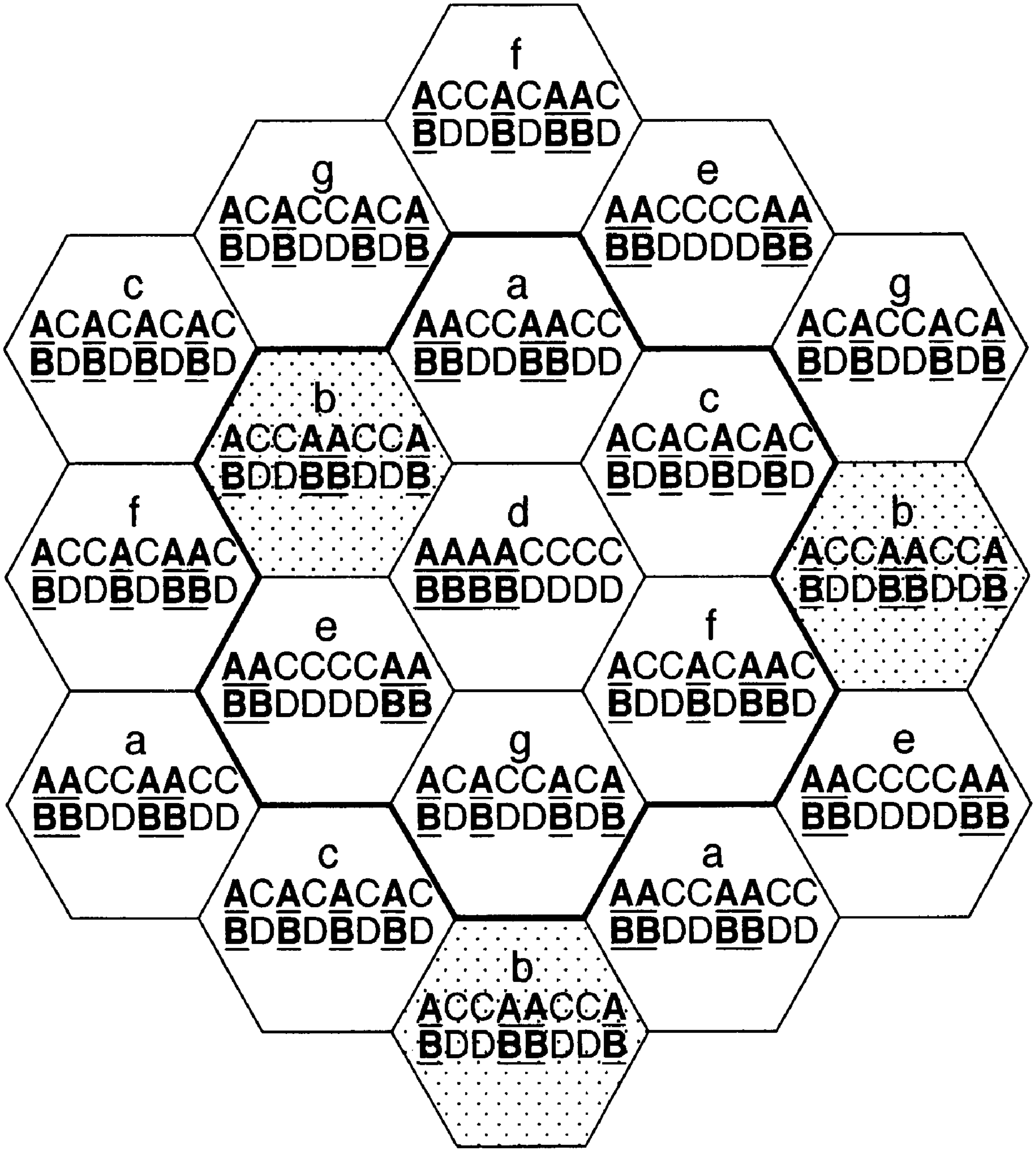
FIG. 9 shows an example of allocation of an antenna pattern for a plurality of base transmission stations (3-SDMA case) according to the present invention.

Referring to FIG. 9, explanation will be given on a second embodiment. This embodiment uses four antenna patterns as shown in FIG. 4A to FIG. 4D.

Figure 4A:
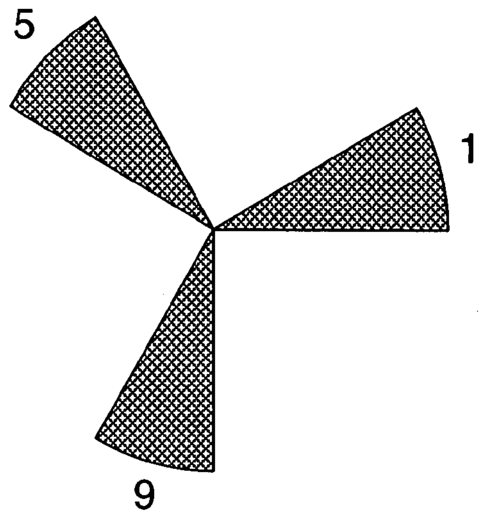
FIG. 4A to FIG. 4D show examples of an antenna pattern when SDMA is executed (3-SDMA case).
Figure 4B:
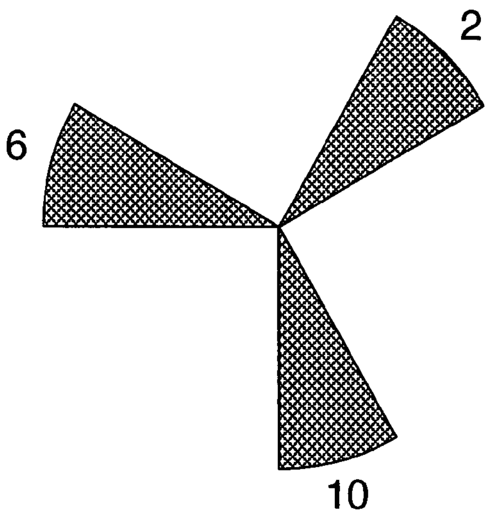
Figure 4C:
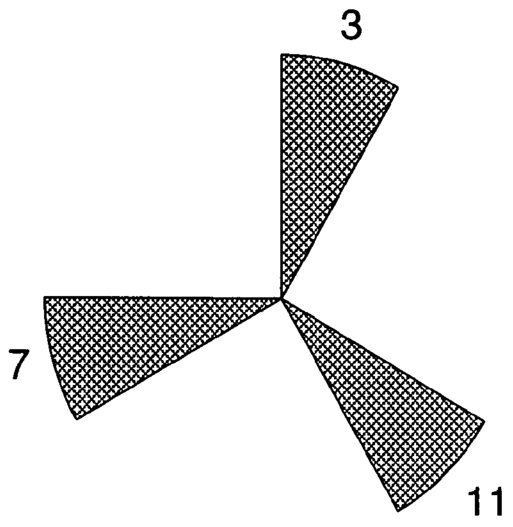
Figure 4D:
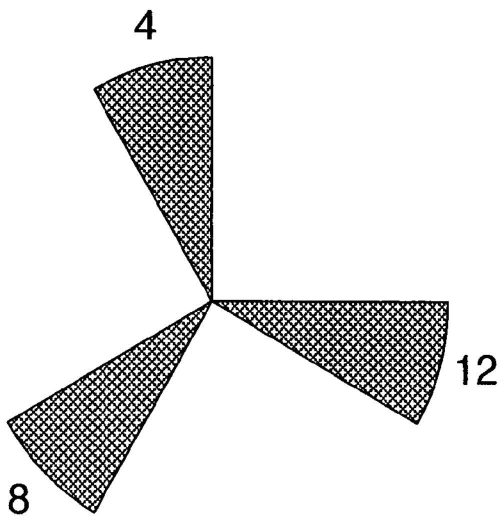
Figure 5:
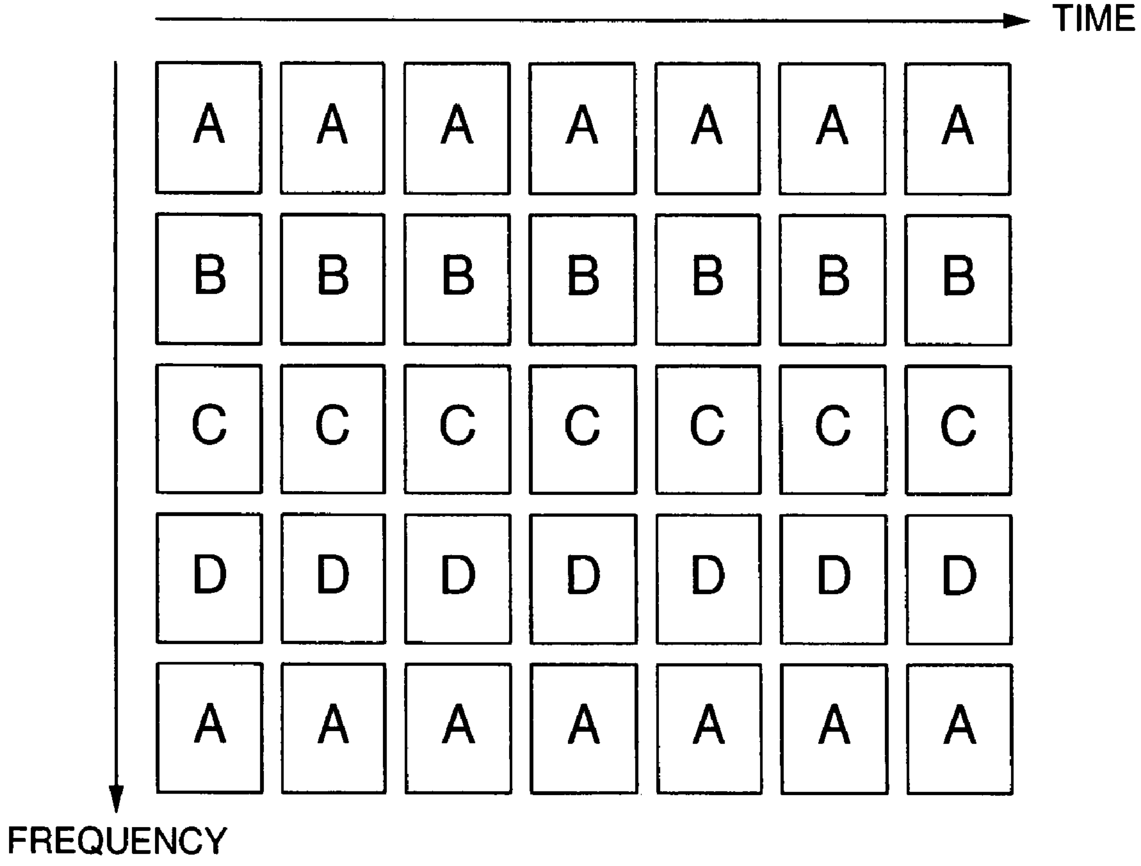
FIG. 5 shows a conventional example of allocation of an antenna pattern for a signal base transmission station (broad band).

When the four antenna patterns of FIG. 4A to FIG. 4D are compared to one another, the antenna pattern A of FIG. 4A and the antenna pattern C of FIG. 4C have opposite beam directions, indicating a high orthogonality on the spatial axis. Moreover, the same holds true with the antenna pattern B of FIG. 4B and the antenna pattern D of FIG. 4D. Conversely, when the antenna pattern A is compared to the antenna pattern B, for example, beams 1 and 2 are in the adjacent directions and there is a possibility that the side lobes may overlap with the main lobes mutually and hence it can not necessarily be said that the orthogonality is high. This means that when the antenna pattern A and the antenna pattern B are in a pair, the both antenna patterns may give interfere to a certain terminal with a high possibility. In other words, when the antenna pattern A of the adjacent base transmission station gives the strongest interference and it is necessary to avoid this, if the remaining alternative is only the antenna pattern B, it is often impossible to have a sufficient interference avoiding effect. Accordingly, in this embodiment, it is proposed that the antenna pattern A and the antenna pattern C are paired while the antenna pattern B and the antenna pattern D are paired. In this way, it is possible to assign the antenna pattern A and the antenna pattern C in the same way as in the first embodiment. Similarly, the antenna pattern B and the antenna pattern D may be assigned. In FIG. 9, the antenna patterns A to D are assigned in this design method. Accordingly, in the case of hexagonal cells, as shown in the example of FIG. 9, each of the cells surrounding a particular cell has different antenna pattern from the particular cell and the six adjacent cells have different antenna patterns from each other. Accordingly, it is possible to obtain a sufficiently randomized antenna pattern, which can solve the problem.

Figure 10:
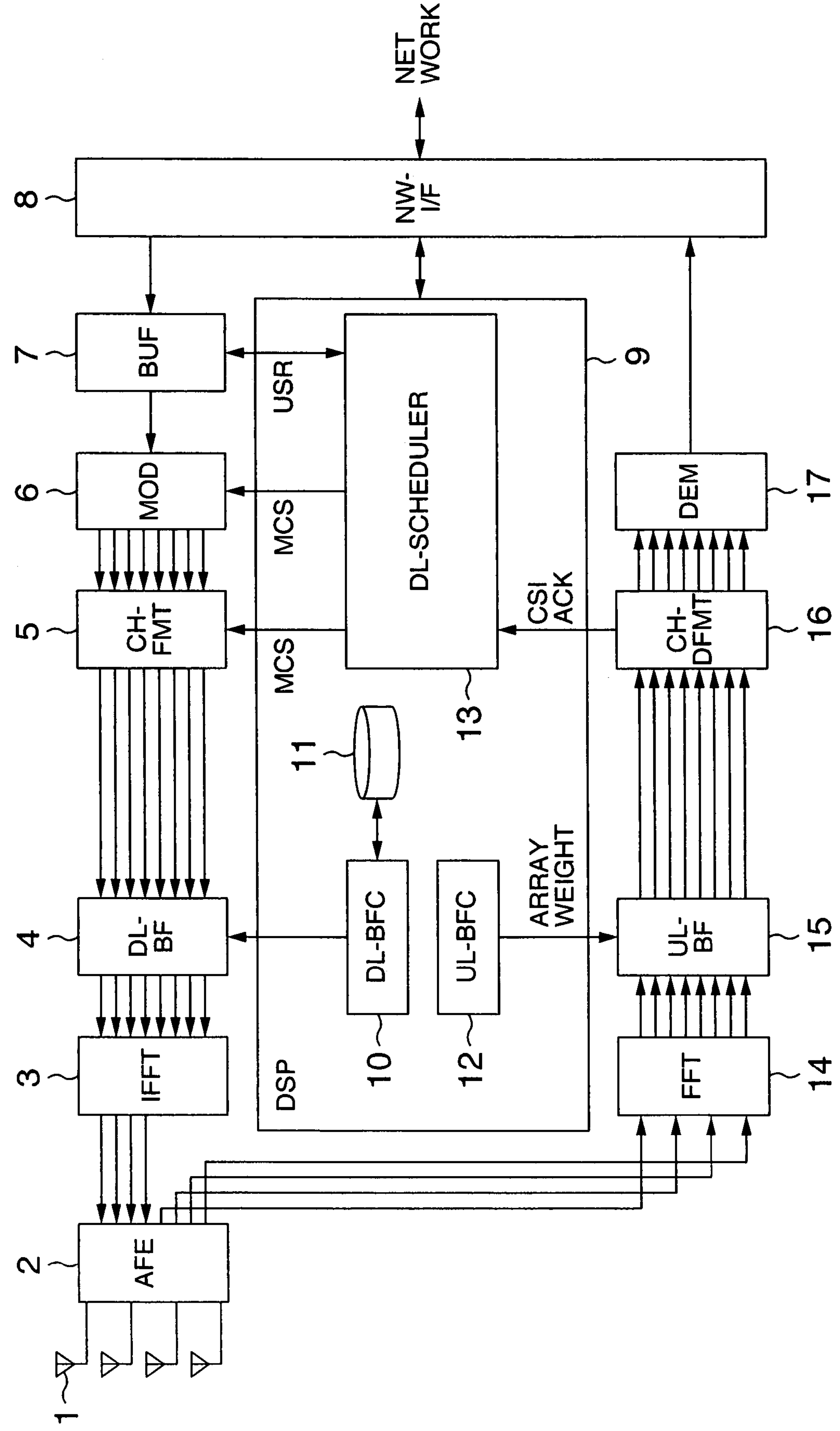
FIG. 10 shows a configuration of a radio base transmission station device according to the present invention.

Referring to FIG. 10, explanation will be given on the signal processing of the base transmission station which simultaneously transmits beams in three directions in the broad band system.

Figure 13:
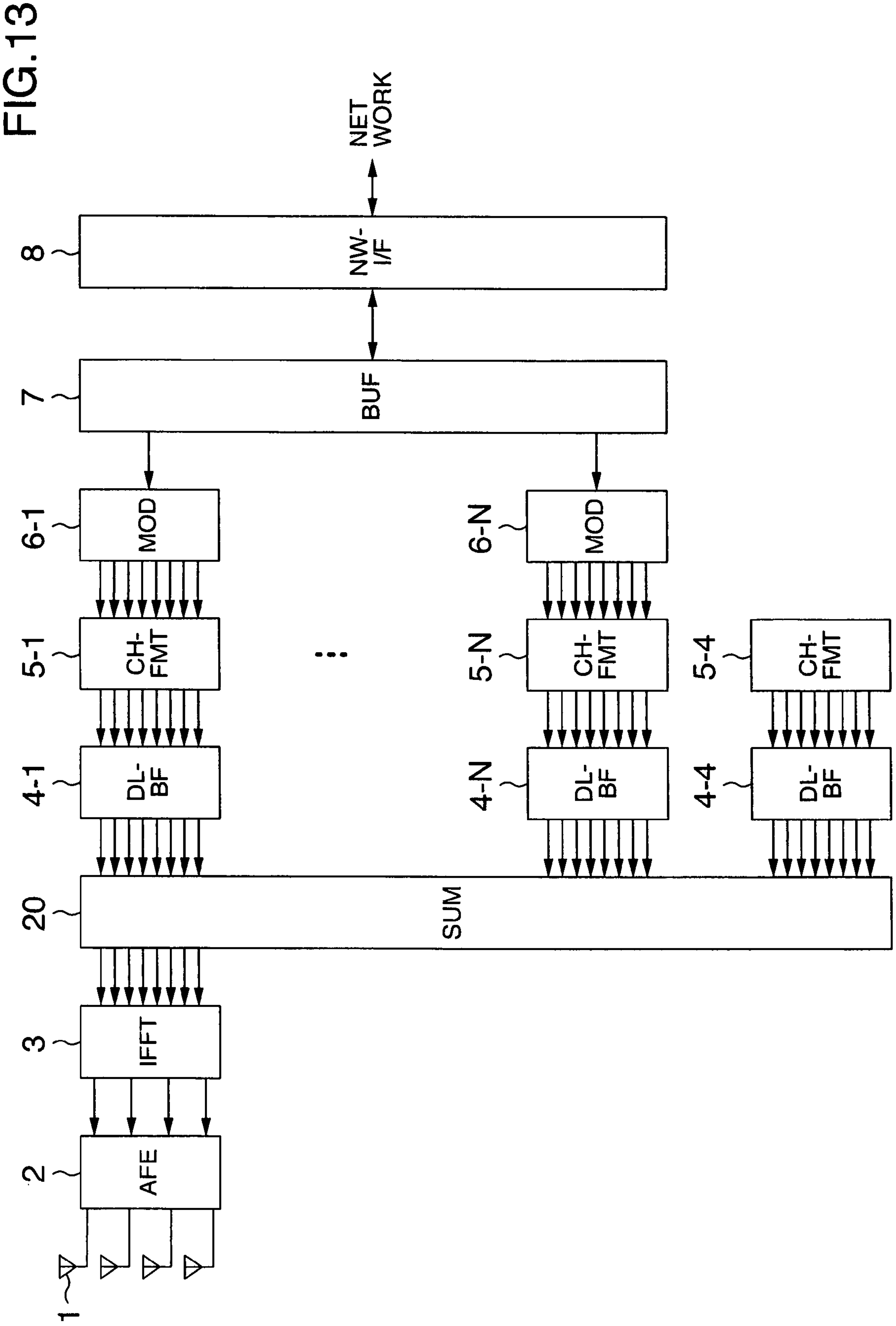
FIG. 13 shows a conventional down link SDMA beam transmission device (broad band).

FIG. 13 shows a configuration of a transmission block baseband processing of an OFDMA-base base transmission station device which can simultaneously transmit up to N signals. The network interface 8 connected to a network acquires information to be transmitted, from the network and accumulates it in the buffer 7. The transmission timing and the modulation method of the accumulated information are decided by the scheduler 13. Using transmission channel information (CSI: Channel State Information) reported from the terminal, the modulation method is decided according to its quality, i.e., the C/I and needs, such as real time communication or non-real time communication. The transmission timing is decided according to the priority in relation with other communications and CSI, for example, according to scheduling algorithm such as proportional fairness, taking account of needs, such as real time communication. According to the beam to be transmitted, the transmission user is selected before the scheduling algorithm such as proportional fairness is activated. The transmission information decided by the scheduler is acquired from the buffer 7 and processing such as encoding of the propagation channel and 64QAM mapping are performed by the modulation block 6. Since transmission is performed by the SDMA pattern in FIG. 3, the modulation block 6 executes signal processing of simultaneous communication of up to 6 users in the same frequency band. The signals processed by the modulation block 6 are then inputted to the channel formatting block 5, where information such as the pilot signal and the dedicated control channel are added. The output of the channel formatting block 5 is multiplied by an array weight required for beam forming by the down link beam forming block 4 and the signals simultaneously transmitted with the same frequency are added and combined into a signal for each of the antennas and sub carriers. For the down link beam forming block 4, the array weight is specified by a down link beam forming control block 10. In this embodiment, since a combination of array weights based on a predetermined design like in FIG. 8, array weights are stored in advance in a array weight memory 11. The beam forming control block 10 references this and specifies an array weight for the down link beam forming block 4. The signal for each antenna/sub carrier combined into the signal for each antenna by the beam forming block is converted from frequency domain information into time domain information in the IFFT block 3 and becomes information for each antenna. The obtained time domain signal for each antenna is subjected to analog conversion and frequency conversion in the analog front end block 2 and transmitted from the antenna 1 after an appropriate signal amplification. The same operation is performed for the up link line circuit in FIG. 10. That is, the signal received by the antenna 1 is converted into a baseband signal in the analog front end block 2 and converted into a frequency domain in the FFT block 14 performing FFT calculation at an appropriate timing. The frequency domain information is subjected to beam forming by adaptive control in the beam forming block 15. It should be noted that a fixed beam also may be used in the up link. The array weight for beam forming is calculated by the up link beam forming control block 12. The signal with reduced interference due to beam forming is subjected to pilot signal separation by a channel deformatting block 16 and then subjected to processing, such as detection, demapping and propagation channel decoding by the decoding block 17, so as to become user information. The obtained information is transmitted to the network via the network interface. The channel deformatting block 16 separates not only the pilot signal but also separates MAC information such as CSI and ACK. These separated information are used in the scheduler.

In this embodiment, in order to execute the antenna pattern in FIG. 8, information for the respective base transmission stations are stored in advance in the memory 11. However, in the cellular communication, the conditions, such as placing of a new base transmission station, are ever changing from time to time. Accordingly, the mechanism capable of modifying the antenna pattern information from the network is convenient. To this end, there is a route for passing information from the network interface to the DSP 9 including the control block such as the scheduler and there is provided a mechanism for modifying the array weight in the memory 11 via the route.

According to the present invention, in the communications using radio such as cellular communication, it is possible to ensure effective communications by using an array antenna. Especially for a user at the cell boundary, it is possible to easily avoid interference from the adjacent radio base transmission station device.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio communication method for a communication system that includes radio base transmission devices, the radio communication method comprising:

transmitting or receiving a signal by a radio wave having a plurality of directivity patterns having a peak in the same direction in each of two or more different frequencies; and between separate, adjacent radio base transmission station devices within the communication system, transmitting and receiving a signal with the two or more different frequencies each combined with a plurality of directivity patterns in different correspondence patterns.

2. The radio communication method as claimed in claim 1, further comprising temporally switching the directivity patterns and transmitting or receiving a signal by a radio wave having the directivity patterns having a peak in the same direction in each of two or more different channels, each of which is a unit for setting a directivity pattern formed by a matrix of frequency and time, and transmitting and receiving between adjacent radio base transmission station devices, a signal with the two or more different channels being combined with the directivity patterns in different correspondence patterns.

3. The radio communication method as claimed in claim 1, wherein at least seven adjacent radio base transmission station devices are combined as a set, in which each of the radio base transmission station devices transmits or receives a signal by a radio wave having a directivity pattern having a peak in the same direction in each of two or more different frequencies and, between different radio base transmission station devices, a signal is transmitted or received with the two or more different frequencies each being combined with the directivity patterns in different correspondence patterns, and wherein a set formed by at least seven adjacent radio base transmission station devices is cyclically repeated.

4. The radio communication method as claimed in claim 1, further comprising generating a correspondence pattern based on a Walsh function for combining the frequency with the directivity patterns between adjacent radio base transmission station devices.

5. A radio communication system, comprising;

at least two radio base transmission station devices having a function of transmitting or receiving a radio signal by a fixed directivity pattern and capable of selecting the directivity pattern according to a frequency, wherein each of the radio base transmission station devices transmits or receives a signal by a radio wave having a directivity pattern having a peak in the same direction in each of two or more different frequencies, and between separate, adjacent radio base transmission station devices within the communication system, a signal is transmitted or received with the two or more different frequencies each combined with a plurality of directivity patterns in different correspondence patterns.

6. The radio communication system as claimed in claim 5, wherein each of the radio base transmission station devices has a function of temporally switching the directivity pattern and transmits or receives a signal by a radio wave having the directivity pattern having a peak in the same direction in each of two or more different channels, each channel being a unit for setting a directivity pattern formed by a matrix of frequency and time, and between adjacent radio base transmission station devices, a signal is transmitted or received with the two or more different channels each combined with the directivity patterns in different correspondence patterns.

7. The radio communication system as claimed in claim 5, wherein at least seven adjacent radio base transmission station devices are combined as a set, in which each of the radio base transmission station devices transmits or receives a signal by a radio wave having a directivity pattern having a peak in the same direction in each of two or more different frequencies and, between different radio base transmission station devices, a signal is transmitted or received in the two or more different frequencies each combined with the directivity patterns in different correspondence patterns, and wherein a set formed by at least seven adjacent radio base transmission station devices is cyclically repeated.

8. The radio communication system as claimed in claim 5, wherein a Walsh function is used for generating a correspondence pattern for combining the frequency with the directivity patterns between adjacent radio base transmission station devices.

* * * * *